Oct. 28, 1947.     C. A. STINE     2,429,779
VALVE ACTUATOR
Filed April 24, 1944
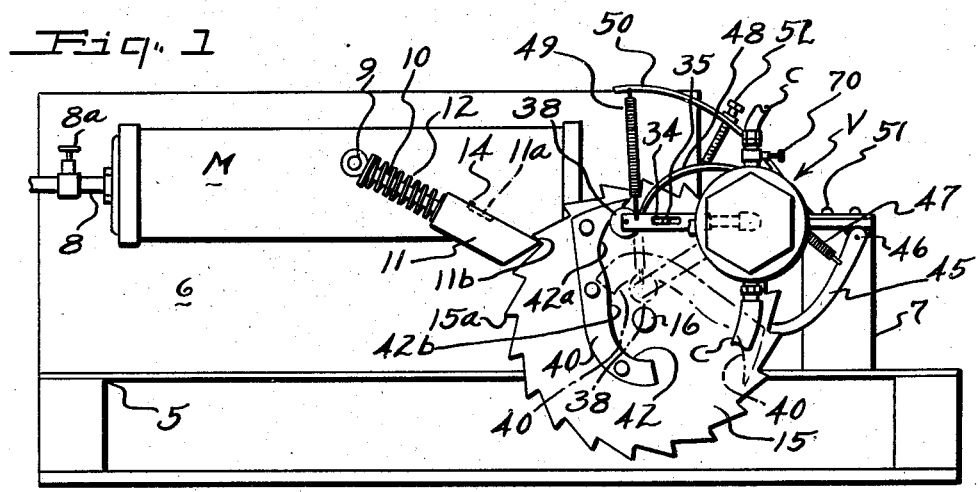
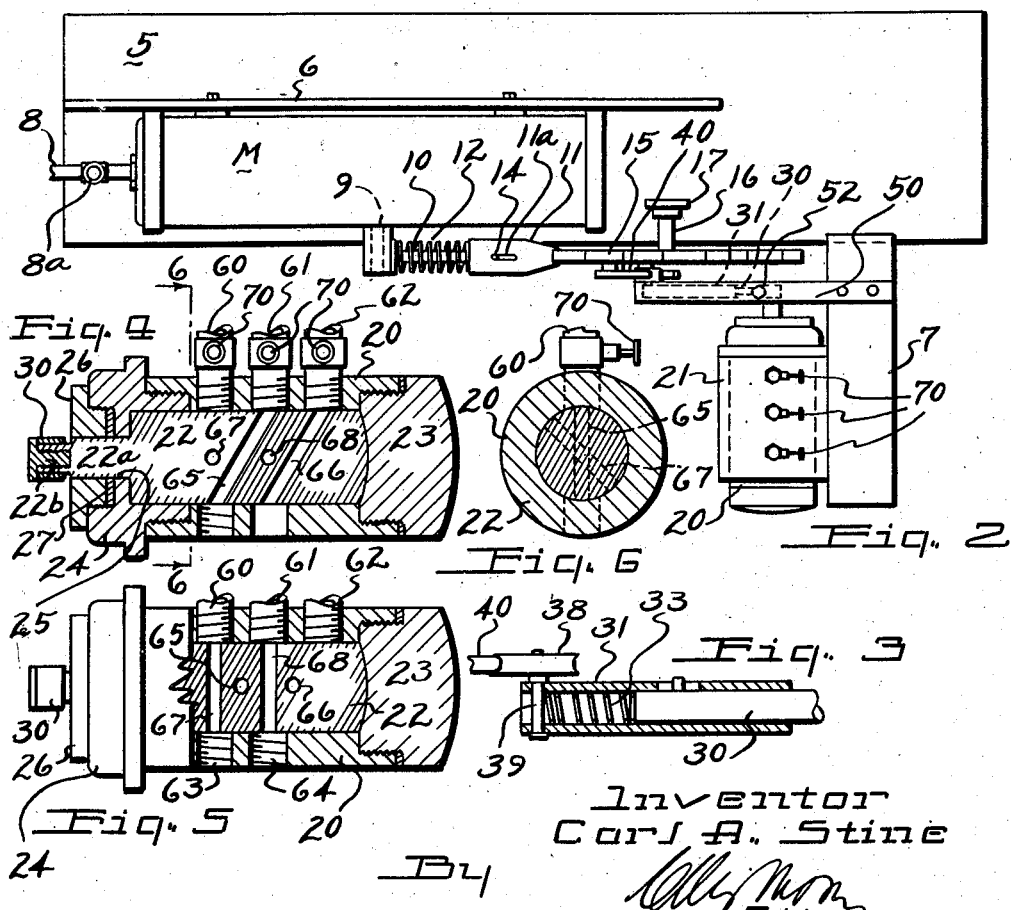
Inventor
Carl A. Stine Patented Oct. 28, 1947

2,429,779

UNITED STATES PATENT OFFICE 2,429,779

VALVE ACTUATOR

Carl A. Stine, Van Nuys, Calif., assignor to Turco Products, Inc., Los Angeles, Calif., a corporation of California Application April 24, 1944, Serial No. 532,410

1 Claim. (Cl. 74—54)

This invention has to do with valves and more particularly it relates to valves embodying means for automatic actuation in timed relation to equipment in conjunction with which they are being used. For instance, in the operation of various cleaning apparatus it is desirable to control the flow of cleaning solution in timed relation to the apparatus and, while adaptable for other uses, it is in such environment that my invention affords one of its chief advantages.

It is an object of the invention to provide a valve incorporating automatic means for intermittent actuation in any desired timed relationship.

It is another object to provide a valve of this character which may be simply constructed and operated and which is susceptible of easy adjustment.

Another object of my invention is to provide novel actuating means for operating a sleeve type valve.

A still further object is to provide a timing control which may be readily adapted to numerous uses where accurate timed actuating of elements is desired.

My invention has still further advantages which will become obvious from the following detailed description of one presently preferred example which I have chosen for the purpose of explaining the invention. I wish it understood, however, that the invention in its broader aspects as defined by the accompanying claim is capable of being carried out in other specific forms of apparatus which the following explanation will suggest to those working in the art.

In the following description I shall refer to the accompanying drawings, in which:

Fig. 1 is a front side elevation;

Fig. 2 is a top plan view.

Fig. 3 is an enlarged fragmentary longitudinal section of the cam follower arm;

Fig. 4 is an enlarged longitudinal sectional view of the valve element taken on line 4—4 of Fig. 6;

Fig. 5 is another sectional view similar to Fig. 4 except that it shows the valve ports in different relative positions; and Fig. 6 is a cross sectional view taken on line 6—6 of Fig. 4.

In the drawings, the numeral 5 designates a base presenting an upright wall 6 and a post 7. Suitably mounted upon wall 6 I provide an air motor M of well-known conventional structure, such, for instance, as may be employed to operate the windshield of an automobile, although other well-known types of motors are suitable for the purposes of my invention. This motor has an oscillating shaft 9 on which is secured an arm 10 which swings upon oscillation of the shaft. An air supply line 8 leads to the motor from means not shown, and is provided with a control valve 8a. A sleeve 11, having a longitudinal slot 11a, is slidably mounted on the arm, being urged outwardly by a coil spring 12. A radial pin 14 on arm 10 projects through a slot 11a providing a stop to prevent escape of the sleeve from the arm.

A ratchet wheel 15 is secured on a shaft 16 journaled in wall 6 and in a bearing 17. The teeth 15a of the ratchet are engageable by sleeve 11 to cause intermittent rotation of the ratchet, the outer end of the sleeve being tapered to present a tooth-engaging point 11b.

A sleeve valve V consists of a sleeve 20 secured to post 7 as by bracket 21 and has a concentric core 22 mounted for rotation in the sleeve. The outer end of the sleeve is closed by a screw plug 23 and the opposite end is closed by a screw plug 24 having an axial opening 25 through which the reduced diameter stem portion 22a of the core rotatably extends, an outer plug 26 providing a stuffing box 27.

An arm 30 is secured on the outer end portion 22b of the core stem, the stem portion fitting within the opening in the arm being of squared cross section to prevent relative rotation. A sleeve 31 is slidably disposed on the arm 30, being urged outwardly by a coil spring 33. Sleeve 31 has a longitudinal slot 34 into which a stop pin 35 extends, the pin being carried by arm 30. The outer end of the sleeve 31 carries a cam follower roller 38, the roller being mounted on the sleeve by means of a cross pin 39 (see Fig. 3) and having a V-shaped peripheral groove to receive the correspondingly shaped cam to be described.

Secured to the outer face of ratchet 15 there is a cam member 40 presenting a curved cam surface 42 of V-cross section which engages the peripheral groove of roller 38 as the ratchet rotates, so that the follower roller swings arm 30 to rotate the valve core 22. For instance, the cam, roller and arm are shown in dot-dash lines in Fig. 1 in course of their movement.

A stop pawl 45 is pivotally mounted on the body by pin and bracket 46, being urged to the left by a coil spring 47 so that the free end of the pawl will engage the teeth of the ratchet to prevent reverse (counterclockwise) rotation of the ratchet.

Sleeve 31, as well as arm 30, are urged upwardly towards an adjustable stop member 48 by a coil spring 49. Stop 48 comprises a resilient arm secured at its righthand end to a support arm 50, the latter arm being secured to the body by a cap screw 51. Thus by means of adjusting screw 52, which is threaded through arm 50, and engaging stop 48 at its free end, the upper limit of movement of the arm 30 may be regulated.

Valve sleeve 20 has ports 60, 61, 62 and ports 63, 64, the latter ports being diametrically opposite ports 60, 61, respectively, to which conduits C are adapted to be connected. The core 22 has a pair of diagonal transverse ports 65, 66 and transverse ports 67, 68, disposed at a 45° angle to ports 65, 66.

When the cam and follower are in the full line position of Fig. 1, the valve ports are in the position shown in Fig. 4 and Fig. 6 wherein core ports 65, 66 are in communication with sleeve ports 63, 61 and 64, 62, respectively, which communication will not be broken until the cam and follower reach the dot-dash line position of Fig. 1, since the curvature of the cam surface portion 42a is such as not to swing the arm 30 sufficiently to break such communication. However, when the cam and follower reach the dot-dash line position of Fig. 1, the curvature of the cam surface portion 42b is such as to swing arm 30 to bring the valve ports into the position of Fig. 5 wherein core ports 67, 68 register with sleeve ports 63, 60 and 64, 61, respectively, which position is maintained until the cam rotates clear of the follower, at which time spring 49 swings the arm 30 upwardly to return the valve ports to the position of Figs. 4 and 6, there being a 45° angle between the said positions of the arm 30. The valve will remain in this position until the ratchet is rotated sufficiently to bring the cam surface 42b again into engagement with the roller 38. The sleeve ports 60—64 are relatively larger in diameter than are the core ports 65—68, so that during the initial period of engagement of the top end of the cam surface with the roller, although there is some slight rotation of the core relative to the sleeve, the ports are not moved fully out of register.

For further adjustment of the valve, individual control valves 70 may be used on the ports 60—62, as shown in Fig. 4.

Speed of operation of the cam may be changed by varying the speed of the motor M, by valve 8a, or by substituting a ratchet wheel with a different number of teeth, so that, if desired, a substantially clock-like slowness of operation may be obtained.

I claim:

In a valve device having a rotatable member presenting a radial actuating arm, means for rotating said member, comprising a body, a wheel rotatably carried by the body, said wheel having a flat side surface, a plate secured to said flat side surface between the axis and periphery thereof, said plate presenting a curved cam surface facing in a direction parallel with said flat side surface, a sleeve for axial sliding movement on said actuating arm, said sleeve being disposed parallel with said flat side surface and presenting a cam follower bearing against said cam surface, spring means urging the follower against the cam surface, and power actuated means for rotating the wheel.

CARL A. STINE.

REFERENCES CITED

The following references are of record in the file of this patent:

UNITED STATES PATENTS

| Number | Name | Date |
|---|---|---|
| 387,008 | Perry | July 31, 1888 |
| 787,803 | Susanka | Apr. 18, 1905 |
| 1,131,953 | Pilkington | Mar. 16, 1915 |
| 1,520,233 | Gabriel | Dec. 23, 1924 |
| 1,760,902 | Grattan | June 3, 1930 |
| 2,350,763 | Jackson | June 6, 1944 |
| 2,385,409 | Gardner | Sept. 25, 1945 |

FOREIGN PATENTS

| Number | Country | Date |
|---|---|---|
| 266,057 | Great Britain | Feb. 18, 1927 |